US008756693B2

(12) United States Patent
Dube et al.

(10) Patent No.: US 8,756,693 B2
(45) Date of Patent: Jun. 17, 2014

(54) MALWARE TARGET RECOGNITION

(75) Inventors: Thomas E. Dube, Beavercreek, OH (US); Richard A. Raines, Centerville, OH (US); Steven K. Rogers, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 60 days.

(21) Appl. No.: 13/438,240

(22) Filed: Apr. 3, 2012

(65) Prior Publication Data

US 2012/0260342 A1  Oct. 11, 2012

Related U.S. Application Data

(60) Provisional application No. 61/471,729, filed on Apr. 5, 2011.

(51) Int. Cl.
*G06F 11/00* (2006.01)
(52) U.S. Cl.
USPC ............... 726/24; 726/22; 726/23; 726/25; 726/26; 713/188; 713/194
(58) Field of Classification Search
USPC ............................ 726/22–26; 713/188, 194
See application file for complete search history.

(56) References Cited

U.S. PATENT DOCUMENTS

| | | | |
|---|---|---|---|
| 5,675,711 A | 10/1997 | Kephart et al. | |
| 5,832,208 A | 11/1998 | Chen et al. | |
| 7,487,544 B2 | 2/2009 | Schultz et al. | |
| 7,519,998 B2 | 4/2009 | Cai et al. | |
| 8,171,553 B2 * | 5/2012 | Aziz et al. | 726/24 |
| 2003/0065926 A1 | 4/2003 | Schultz et al. | |
| 2005/0028002 A1 | 2/2005 | Christodorescu et al. | |
| 2006/0004748 A1 | 1/2006 | Ramarathnam et al. | |
| 2010/0162400 A1 * | 6/2010 | Feeney et al. | 726/24 |
| 2011/0041179 A1 * | 2/2011 | St Hlberg | 726/23 |

OTHER PUBLICATIONS

Kolter et al., "Learning to Detect Malicious Executables in the Wild," Proceedings of the 10th ACM SIGKDD International Conference on Knowledge Discovery and Data Mining, ACM, 2004, pp. 470-478.
Schultz et al., "Data Mining Methods for Detection of New Malicious Executables," IEEE Symposium on Security and Privacy, IEEE, 2001, pp. 38-49.
Tesauro et al., "Neural Networks for Computer Virus Recognition," IEEE Expert 11 (4) (1996), pp. 5-6.
Endsley, M. R., "Design and evaluation for situation awareness enhancement," Proceedings of Human Factors Society 32nd Annual Meeting, vol. 1, pp. 97-100.

* cited by examiner

*Primary Examiner* — Thanhnga B Truong
(74) *Attorney, Agent, or Firm* — AFMCLO/JAZ; Charles Figer, Jr.

(57) ABSTRACT

A method, apparatus and program product are provided to recognize malware in a computing environment having at least one computer. A sample is received. An automatic determination is made by the at least one computer to determine if the sample is malware using static analysis methods. If the static analysis methods determine the sample is malware, dynamic analysis methods are used by the at least one computer to automatically determine if the sample is malware. If the dynamic analysis methods determine the sample is malware, the sample is presented to a malware analyst to adjudicate the automatic determinations of the static and dynamic analysis. If the adjudication determines the sample is malware, a response action is initiated to recover from or mitigate a threat of the sample.

18 Claims, 11 Drawing Sheets

| METHOD | MEAN | 95% CI |
|---|---|---|
| MaTR | 0.999914 | 0.999840 - 0.999987 |
| KM RETEST | 0.999173 | 0.998926 - 0.999421 |
| KM ORIGINAL | 0.9958 | 0.9934 - 0.9982 |

FIG. 10

| METHOD | MEAN | 95% CI |
|---|---|---|
| MaTR | 0.999166 | 0.999007 - 0.999325 |
| KM RETEST | 0.989919 | 0.988897 - 0.990941 |
| SCHULTZ (STRINGS) | 0.9711 | NOT REPORTED |
| SCHULTZ (DLL FUNCTION CALLS) | 0.8936 | NOT REPORTED |

FIG. 11

| METHOD | TP | FP | TN | FN |
|---|---|---|---|---|
| MaTR | 3,112 | 2 | 2,517 | 3 |
| KM RETEST | 3,072 | 14 | 2,505 | 43 |

FIG. 12

| METHOD | MEAN | 95% CI |
|---|---|---|
| MaTR FPR | 8.73e-4 | 5.80e-4 – 1.17e-3 |
| MaTR FNR | 8.03e-4 | 4.56e-4 – 1.15e-3 |
| KM RETEST FPR | 5.64e-4 | 3.65e-3 – 7.62e-3 |
| KM RETEST FNR | 1.37e-4 | 1.23e-2 – 1.51e-2 |
| SCHULTZ (STRINGS) FPR | 3.80e-2 | NOT REPORTED |
| SCHULTZ (STRINGS) FNR | 2.73e-2 | NOT REPORTED |
| SCHULTZ (DLL FUNCTION CALLS) FPR | 7.77e-2 | NOT REPORTED |
| SCHULTZ (DLL FUNCTION CALLS) FNR | 2.89e-1 | NOT REPORTED |

FIG. 13

| METHOD | MEAN | 95% CI |
|---|---|---|
| MaTR | 0.985612 | 0.981508 – 0.989629 |
| KM RETEST | 0.949640 | 0.941552 – 0.957733 |
| ANTIVIRUS 1 | 0.467626 | 0.449780 – 0.485431 |
| ANTIVIRUS 2 | 0.388489 | 0.370665 – 0.406214 |
| ANTIVIRUS 3 | 0.356115 | 0.340914 – 0.371229 |

FIG. 14

MALWARE TARGET RECOGNITION

CROSS-REFERENCE TO RELATED APPLICATIONS

This application claims the benefit of and priority to U.S. Provisional Application Ser. No. 61/471,729, entitled "Malware Target Recognition," filed on Apr. 5, 2011, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention generally relates to computer and network security and, more particularly, to detecting malware in an operational computing environment.

2. Description of the Related Art

The widespread adoption of networked Information and Communication Technologies (ICT) by all facets of society has made massive amounts of valuable information vulnerable to digital theft. As organizations and individuals embed ICT into their core operational processes, many have unwittingly exposed themselves to exploitation. The result is an extremely appealing target for competitors and a new wave of cyberspace criminals lured by easy profit and unlikely prosecution. More information is available today for surreptitious exploitation than ever before, while organizations continue to struggle with standard passive computer network defense (CND) practices and are only beginning to realize true attacker perceptions of their information's value.

Malware has become the cyberspace weapon system of choice enabling attackers to conduce a wide gamut of offensive information operation s as evidenced by the now infamous Stuxnet worm. The Stuxnet worm payload causes a loss of data integrity for supervisory control and data acquisition (SCADA) systems, which run industrial control systems, such as power grids. One of the most dangerous operations is data exfiltration, where attackers can increase their competitive edge by harvesting sensitive information from unsuspecting victims. Imagine the value and impact of obtaining blueprints for the most advanced jet fighter at no substantial cost or obtaining millions of sensitive customer records.

Malware detection has been an active computer security research area for decades. Advances in this area have not produced a "silver bullet" solution to this problem because it is ultimately a human enterprise. Consequently, a relatively small set of malware can hide amongst a million unique executables on large networks making it difficult for humans to find without a form of automated assistance.

With attacker motivation at an all-time high, customized malware attacks are becoming more common and allow adversaries to sidestep the traditional front-line defense, signature-based antivirus software. These antivirus systems are passive and reactive by nature, because they require previous malware analysis and signature development. Contemporary antivirus products often fail to detect modified threat tools that use evasive methods such as no-operation instruction insertion, reordering of subroutines, register reassignment, and instruction substitution, among others.

Cyberspace adversaries are adaptable foes, and methods to detect them must also be capable of adaption or risk becoming obsolete. This observation has produced unique research momentum for new detection technologies that do not require a continual stream of updated antivirus signatures. Generic detection technologies make extensive use of classic pattern recognitions and machine learning techniques. If hackers can victimize governments and high-profile corporations by avoiding antivirus software, the risk to lesser-financed organizations is likely higher than perceived. Visibility into network activity is limited, because of the immense volume of data and the difficulties associated with effective data reduction.

In order to understand the current state of a conventional network, individuals must have sufficient situation awareness, or "the perception of elements in an environment within a volume of time and space, the comprehension of their meaning and the projection of their status in the near future" as defined in Endsley, M. R., "Design and evaluation for situation awareness enhancement," Proceedings of Human Factors Society 32nd Annual Meeting, Volume 1, pp. 97-100. With adequate situation awareness, organizations can perceive previously unknown threats, comprehend threat capability and ultimately project future threat activity. Sufficient situation awareness may assist in enabling organizations to short circuit the impact of continuing threat activity.

Competitive threats can easily employ similar techniques to make unique malware samples that victim defensive tools cannot detect. An advanced persistent threat (APT) is a nation-state or large corporate-sponsored competitive threat that is capable and determined to accomplish its goals. While malware is not the only method of gaining information at the APT's disposal, it can satisfy their operational needs for victim network access, data exfiltration and data corruption. Achieving cyberspace SA may assist in allowing organizations to potentially discover and thwart APT operations. Major asymmetric advantages of the competitive threat may include unauthorized access to competitor sensitive data, low likelihood of discovery and prosecution, and low tool development cost, making cyberspace attacks attractive to the attackers.

Accordingly, there is a need in the art for a method of increasing situational awareness to identify malware, predict its behavior, and halt any such cyberspace attacks.

SUMMARY OF THE INVENTION

Embodiments of the invention provide a method of recognizing malware in an operational computing environment having at least one computer. The method includes receiving a sample. Then at least one computer automatically determines if the sample is malware using the most efficient methods available, which typically are static analysis methods. If the static analysis methods determine the sample is malware, then at least one computer using less efficient methods, including most dynamic analysis methods, automatically determines if the sample is malware, either refuting or confirming the prediction from the more efficient methods. If the dynamic analysis methods determine the sample is malware, the sample is presented to a malware analyst with highlighted significant malware indicators discovered by the automated methods for human adjudication of the automatic determinations of the static and dynamic analyses. If the adjudication determines the sample is malware, a response action is initiated to recover from or mitigate a threat of the sample.

Embodiments also provide an apparatus having a memory and a processor. A program code is resident in the memory and configured to be executed by the processor for recognizing malware. The program code is further configured to receive a sample and automatically determine if the sample is malware using static analysis methods. If the static analysis methods determine the sample is malware, the program code is configured to use dynamic analysis methods to automatically determine if the sample is malware. If the dynamic analysis methods determine the sample is malware, the program code is further configured to present the sample to a malware analyst to adjudicate the automatic determinations of the static and dynamic analyses. The program code is also configured to receive a notice of response action appropriate to recover from or mitigate the threat posed by the sample if the adjudication determines the sample is malware.

Embodiments of the invention additionally provide a program product having a computer recordable type medium and a program code resident on the computer recordable type medium and configured to recognize malware. The program code, when executed on a hardware implemented processor, is configured to receive a sample and automatically determine if the sample is malware using the most efficient methods available, which typically are static analysis methods. If the static analysis methods determine the sample is malware, the program code is configured to use less efficient methods, including most dynamic analysis methods, to automatically determine if the sample is malware. If the dynamic analysis methods determine the sample is malware, the program code is further configured to present the sample to a malware analyst with highlighted significant malware indicators discovered by the automated methods for human adjudication of the automatic determinations of the static and dynamic analyses. The program code is also configured to receive a notice of response action appropriate to recover from or mitigate a threat posed by the sample if the adjudication determines the sample is malware.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 10 is a table containing mean area under curve (AUC) and confidence intervals;

FIG. 11 is a table containing mean accuracy and confidence intervals;

FIG. 12 is a table containing mean confusion matrix for an embodiment of the invention and the n-gram retest following the Kolter and Maloof methodology;

FIG. 13 is a table containing confidence intervals for false positive rate (FPR) and false negative rate (FNR); and FIG. 14 is a table containing mean true positive rate (TPR) and confidence intervals on unknown samples.

Figure 1:
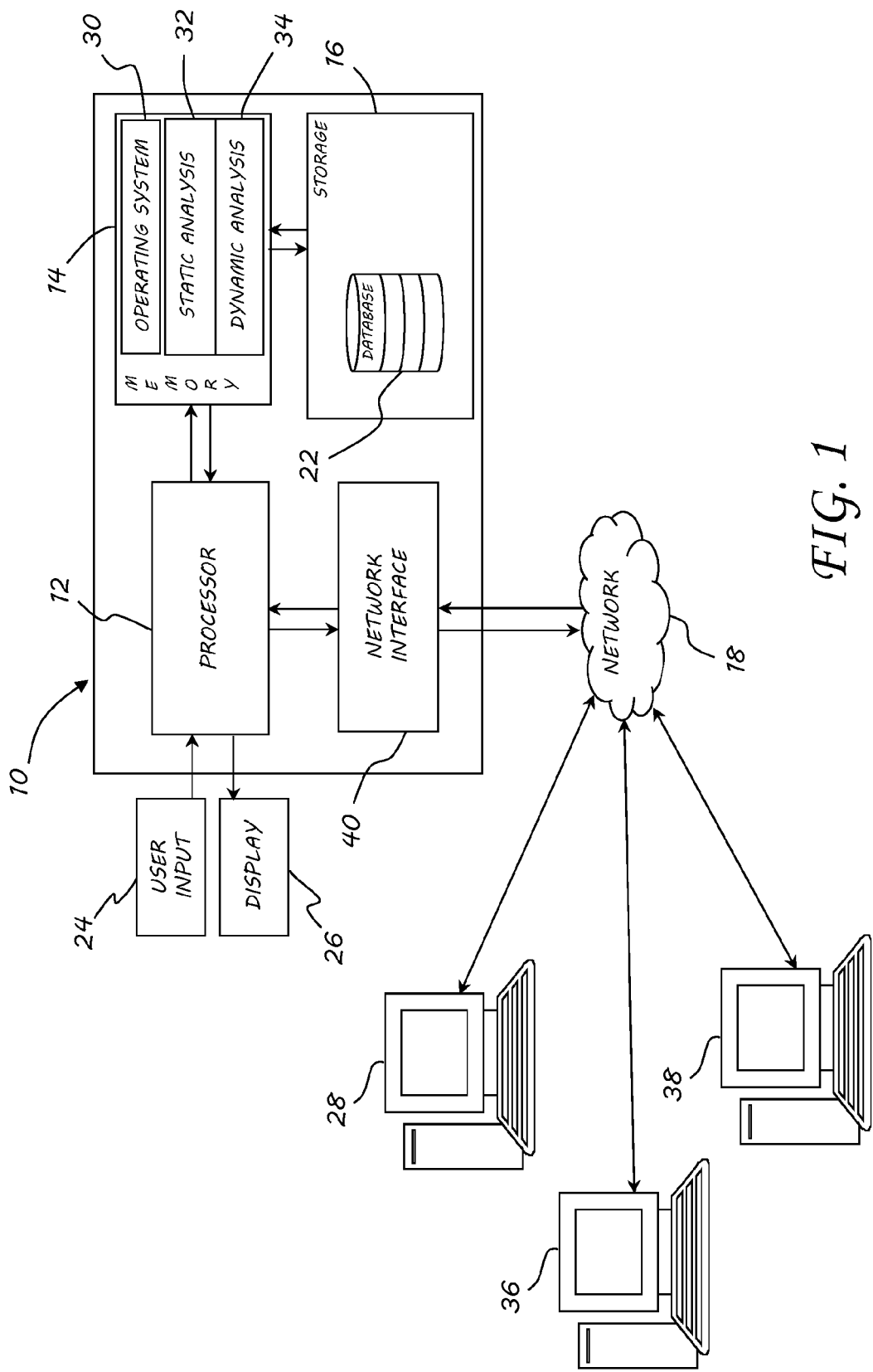
FIG. 1 is a block diagram of an exemplary hardware and software environment in which embodiments of the invention may be implemented.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

With exponential increases in malware propagation, malware detection has become a robust research area in academia and industry. Heuristic analysis techniques generally fall into two distinct categories: static and dynamic. Static heuristics generally use non-runtime indicators, such as structural anomalies, program disassembly and n-grams. Alternatively, dynamic heuristics employ runtime indicators normally obtained in virtual environments, such as commercial sandbox applications.

Static analysis techniques do not require central processing unit (CPU) emulation or execution. And since emulation or execution not needed, they generally are more efficient methods of data reduction than dynamic analysis methods. For example, static analysis methods may utilize disassembly of program instructions, control flow analysis, or the frequency occurrences of byte strings.

Dynamic analysis techniques require CPU emulation or execution. These methods observe program behavior externally by observing sample execution in a protected analysis environment (i.e., a "sandbox") or by emulating the execution of the program on a virtual CPU. They must track detailed system state information to emulate the effect of instructions. Actual execution obviously must track system state information as well, which consumes system resources and time. Analyzing large programs may take seconds to complete and may provide an inaccurate or incomplete assessment of program functionality due to a particular path of execution emulated or executed. The Michelangelo virus, for example, is malware that does not execute its malicious payload until after a specific time period or event occurs. Thus, if specific program dependencies are unavailable, the evaluated sample may not execute properly. Typically, dynamic analysis entails running a sample for a period of time in a virtual sandbox or on actual hardware. Dynamic analysis techniques usually require more time to complete than static analysis techniques.

Despite the success that static heuristics has generally enjoyed, contemporary research heavily favors dynamic heuristics. However, dynamic analysis methods suffer from limited operational utility due to slower runtime speeds than their static counterparts and incompleteness. The dynamic analysis performance makes it generally operationally infeasible to test tens of thousands of unique programs on a single system, which may introduce a new requirement for prioritization capabilities at the very least. Dynamic heuristic analysis is also incomplete, because there is no guarantee of actually observing malicious activity.

Presently, commercial antivirus products are the traditional frontline defense against malware, but research shows that commercial products can be relatively easy to avoid. Advanced persistent threats certainly have the ability to avoid commercial antivirus products. If organizations rely exclusively on commercial antivirus protection, they may inadvertently be subjecting themselves to advanced persistent threats. Total solutions for malware are not presently available as it is ultimately a human enterprise. Still, serious operational problems exist today that require not only reliable, but operationally viable, solutions.

Classic signature-based antivirus systems are effective at stopping global computer virus outbreaks, but are notoriously simple to avoid for advanced threats. Automated detection of such threats requires generic pattern recognition systems that determine program functionality using features common to dynamic or static analysis. Dynamic analysis is a behavior based approach requiring runtime observation of samples in a protected environment. Static analysis is generally more efficient at detecting malware, because it uses high-level information, such as n-grams, strings and metadata (data describing program structure and data). A weakness of static analysis techniques is that their cursory inspection can lead to less definitive predictions than dynamic analysis methods.

Although pattern-based malware detection is extremely valuable, it provides no real threat context in the discovery of malware on a system with access to sensitive information. The additional context of the malware payload, such as backdoor, keylogger or adware, elevates the cyber situational awareness to an actionable level. The presence of a backdoor indicates that a competitor may have exfiltrated company secrets, while a keylogger may indicate a compromise of user credentials. Both of these discoveries require immediate, unique responses while a response to adware is likely trivial. Without the context of malware payload, the prediction information provided by detection methods alone is not actionable.

The automated classification of computer software is an interesting problem because of its potential impact in information assurance and policy compliance. For example, identification of games and other programs on business networks alerts leadership to fraud, waste, and abuse of resources. Classifying games versus other software, because of the known quantities, makes its application relatively simple given enough samples. Classifying between malware samples is a more difficult problem, because of the reliance on expert antivirus researchers who often disagree on what class a particular exemplar belongs.

Generally, a first step in subcategorizing malware is to determine that a particular sample is indeed malicious. Often this step is not overly difficult, because most normal software does not use advanced defense capabilities, such as packing and other code obfuscation. Simple heuristics are often ineffective by themselves, such as checking for indication of a packer does not necessarily translate to correct malware detections. In fact, some antivirus vendors intentionally package signature updates in self-extracting, packed executables, because it is a simple method to obfuscate the signatures to avoid inadvertent "detection" from the antivirus software.

After determining that a particular sample is malicious, researchers attempt to categorize the sample into a more descriptive subclass or type. This type information is often the basis for communicating the functionality of the program to other researchers, customer information technology (IT) staff, and the general public. This categorization is normally based on a functional analysis of the sample, but a small handful of generic pattern recognition research efforts exist as well.

Thus, improving cyber situational awareness through identification and classification of malware is an objective of embodiments of the invention. Increasing awareness assists in leading to improved mission assurance, because it provides leadership with the appropriate level of information for risk assessment and management. Recent static analysis research focuses exclusively on detection without investigating malware types or payloads, forcing leadership to make decisions without understanding associated risks.

Embodiments of the invention extend contemporary capabilities with additional malware characteristics, such as identifying most likely propagation methods and payloads, as well as detection to provide more threat context by using only static heuristics. The embodiments examine the application of classic pattern recognition techniques used in static detection to determine types of malware while preserving high detection rates. Some of these embodiments may achieve prediction accuracy rates of above approximately eighty percent for malware propagation and payload identification, while maintaining a near perfect detection rate. These indicators may provide a significant improvement in cyber situational awareness over contemporary methodology. This additional context may also assist in the prioritization of analyst backlogs or more aggressive dynamic analysis components of the invention.

Turning now to the drawings, wherein like numbers denote like parts throughout the several views, FIG. 1 illustrates an exemplary hardware and software environment for an apparatus 10 suitable for performing malware detection in a manner consistent with embodiments of the invention. For the purposes of the invention, apparatus 10 may represent practically any computer, computer system, or programmable device, e.g., multi-user or single-user computers, desktop computers, portable computers and devices, handheld devices, network devices, mobile phones, etc. Apparatus 10 will hereinafter be referred to as a "computer" although it should be appreciated that the term "apparatus" may also include other suitable programmable electronic devices.

Computer 10 typically includes at least one processor 12 coupled to a memory 14. Processor 12 may represent one or more processors (e.g. microprocessors), and memory 14 may represent the random access memory (RAM) devices comprising the main storage of computer 10, as well as any supplemental levels of memory, e.g., cache memories, non-volatile or backup memories (e.g. programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or another computer coupled to computer 10 via a network 18. The mass storage device 16 may contain a cache or other data space, which may include a classification database 22.

Computer 10 also typically receives a number of inputs and outputs for communicating information externally. For interface with a user or operator, computer 10 typically includes one or more user input devices 24 (e.g., a keyboard, a mouse, a trackball, a joystick, a touchpad, a keypad, a stylus, and/or a microphone, among others). Computer 10 may also include a display 26 (e.g., a CRT monitor, an LCD display panel, and/or a speaker, among others). The interface to computer 10 may also be through an external terminal connected directly or remotely to computer 10, or through another computer 28 communicating with computer 10 via a network 18, modem, or other type of communications device.

Computer 10 operates under the control of an operating system 28, and executes or otherwise relies upon various computer software applications, components, programs, objects, modules, data structures, etc. (e.g. static analysis techniques 32 and dynamic analysis techniques 34). The static analysis techniques, for example, may analyze potential malware threats as set out above using known information that may be stored on databases, such as the classification database 22. Similarly, dynamic analysis techniques 34 may set up a virtual environment in memory 14 as also set out above. Computer 10 communicates on the network 18 with other computers 28, 36, 38 through a network interface 40.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
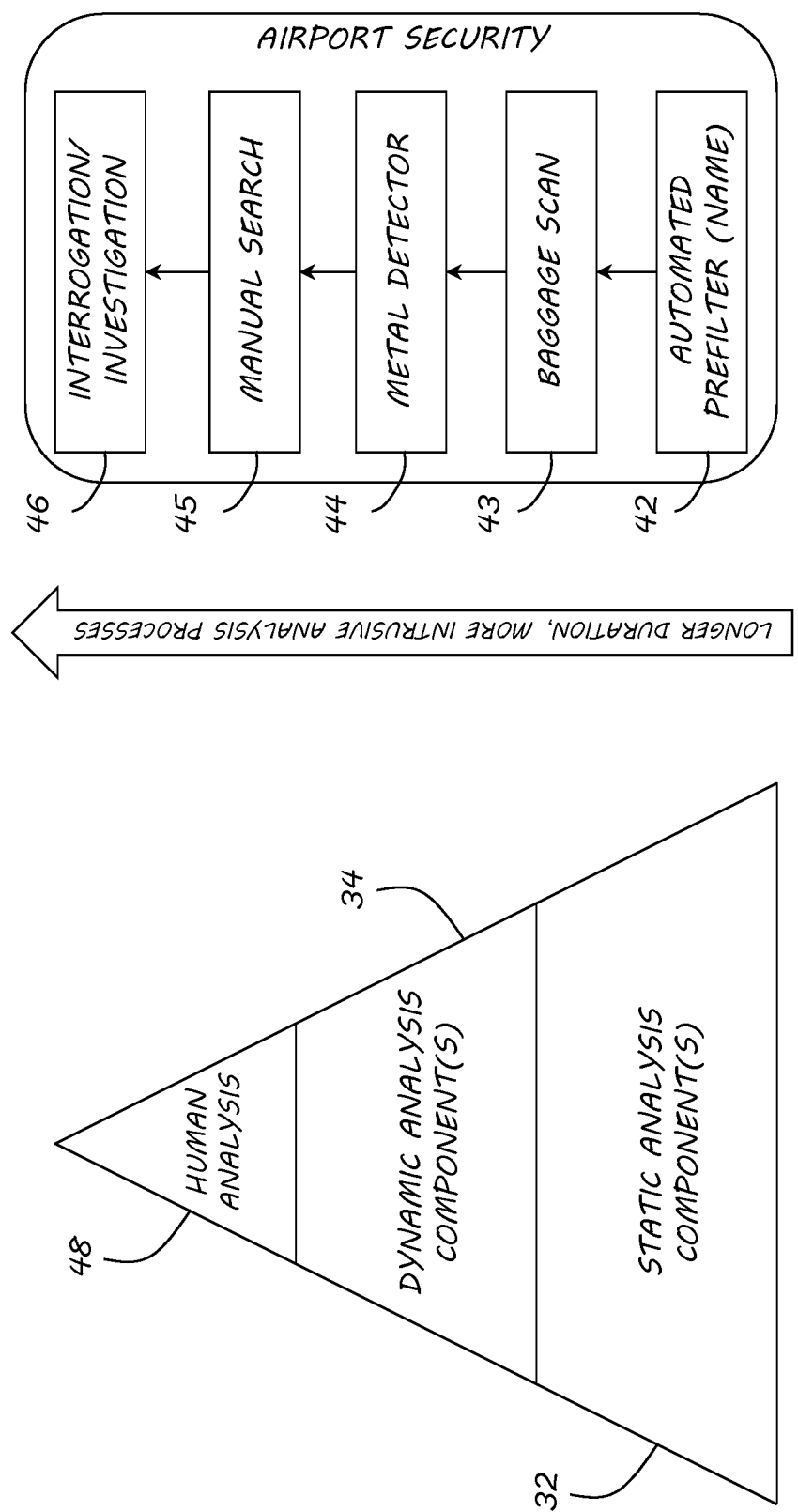
FIG. 2 is a diagram depicting a parallel between the architecture of embodiments of the invention and contemporary airport security screening hierarchy.

The high-level conceptual process of the embodiments of the invention is to perform a sequence of data reduction steps to enable human (malware) analysts to effectively discover malware threats. FIG. 2 shows this process graphically with the more efficient static malware techniques 32 filtering down the entire dataset to a smaller and more manageable set for slower analysis methods.

This concept of the embodiments of the invention parallels the concept of security at an airport, where screening methods are serialized in order of increasing invasiveness and generally in cost terms of time required. In this environment, any positive observation from screening leads to a more intensive scrutiny of the passenger and their belongings. An initial screening of a passenger may be accomplished with an automated prefiltering of passengers, based on name, for example 42. The next level of screening, which requires more overhead and time, would be to scan the passenger's baggage 43. In parallel with or after the scanning of the baggage 43, the passenger may further be checked by walking through a metal detector 44. If either of the baggage scan 43 or metal detector 44 raise suspicion with the passenger, an agent may perform a manual search of the passenger's person or their baggage 45. If there is still suspicion, the passenger may further be scrutinized via an interrogation or other investigation 46. Each level adds additional scrutiny, when warranted, to passengers while allowing many to be screened rather quickly. The concept of the embodiments of the invention is subtly different as it allows for the exact analogy above, but employment of the invention may also use subsequent slower methods to justify further its predictions to a human operator.

The architecture of embodiments of the invention employs a more efficient analysis methods (generally static 32, though other embodiments may utilize other methods) to serve as an initial filter for the huge dataset of all software or at least all software stored on an organizational entity network in secondary or volatile storage, for example. Slower malware analysis methods (generally dynamic 24, though other embodiments may utilize other methods) may be operationally infeasible to apply to this initially huge dataset because of the time overhead required. By initially filtering the set with more efficient methods, these slower analysis methods become more operationally relevant. Another distinction between embodiments of the invention and contemporary malware detection methods is the realization that malware detection and classification is not the goal. Rather, enabling the human operators to find malware and mitigate risk associated with these threats is a goal of this architecture and subsequent processes. The top of the pyramid in FIG. 2 is the human (malware) analyst 48, who serves as a final adjudication of the automated system's predictions. The malware analyst 48 may confirm the findings of the automated methods 32, 34 to provide cyberspace defenders with not only actionable information, but also further threat (context) details.

Figure 3:
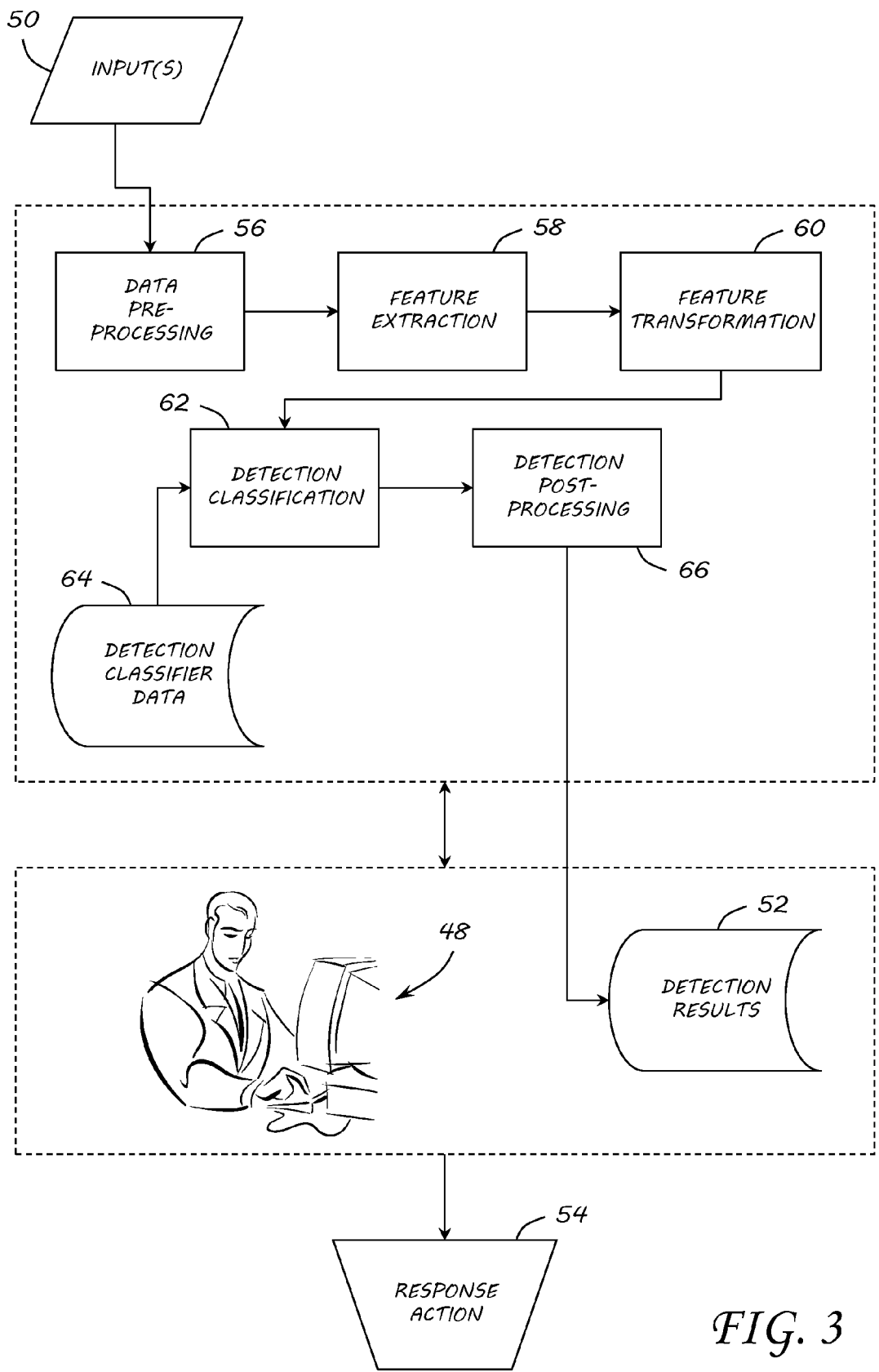
FIG. 3 is a block diagram depicting a system process of embodiments of the invention.

Embodiments of the invention use a straightforward process for detecting malware using only a program's high-level structural data. While many researchers and commercial companies utilize similar structural data, none rely exclusively on this source of data and achieve the performance levels of the embodiments of the invention. FIG. 3 shows the inputs 50 and outputs 52, 54 of some of the embodiments and illustrates their internal process. Inputs 50 to the embodiments are generally executable files, such as portable executable (PE) files common in the Microsoft Windows operating systems, for example.

In the architecture of some of the embodiments of the invention, the operator 48 becomes a component receiving and providing feedback to the rest of the system and eventually initiating a response action 54. Limiting features to contextually significant information is a requirement to maximize potential feedback with a human operator 48. This benefit may be visualized when considering the comprehension difficulty for a human faced with the resulting decision process of an n-gram solution or the lack of decision making information provided by a commercial antivirus product that only provides the final result. The "Data Pre-processing" stage 56 allows for any steps required before feature extraction 58 and subsequent classifications. Data pre-processing actions may include discovery of valid executable files. Other actions may include pre-filtering known malware and known non-malware, decrypting data, and data sharing with other sensor systems.

During "Feature Extraction" 58, the system parses the input file to find predetermined data inputs for the subsequent classifiers. Features (set forth in more detail below) may be restricted to the input file's high-level structural anomalies and raw structure information. "Feature Transformation" 60 involves any action taken on features before classification, such as bounding, mapping, projecting, etc. Examples of well known transformations may include principal component analysis and factor analysis.

The "Detection Classifier Data" component represents the data for the trained classifier. For example, decision tree classifiers must correctly initialize a binary tree node structure with appropriate cut features to uniquely identify the specific feature to test, cut values and classification decisions for the leaf nodes of the decision tree.

The underlying boosted decision tree classifier includes a "Detection Classification" component 62. At this point, the classifier takes transformed features and makes classification decisions based on an underlying algorithm, potentially using detection classifier data 64. For example, in decision trees, the decision sequence begins at the root node and progresses down to a single leaf node where the classification decision is determined. "Detection Post-processing" 66 allows for post-filtering before presenting preliminary results to the operator 48, triggering additional actions, result verification with other systems, or data fusion with additional sensors.

This architectural process encompasses the concept of first using the most efficient methods for malware detection and classification for organizational cyber defense against malware. An operational-level goal of this process is efficient data reduction for the individual human malware analyst or team of analysts, who serves as the adjudication point and authoritative threat information source for the organization.

Figure 4A:
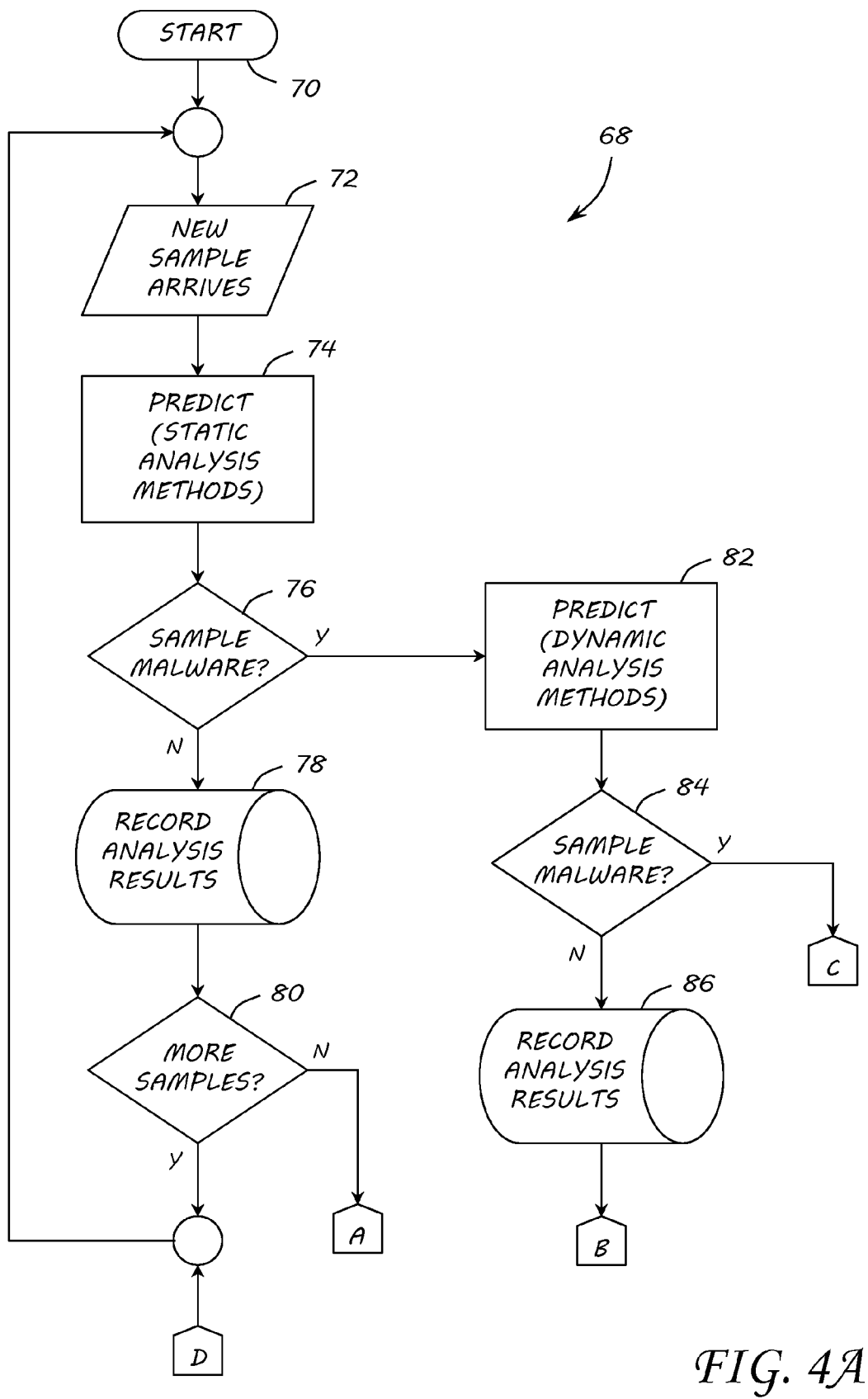
FIGS. 4A and 4B are a flowchart depicting an architectural process of the system process in FIG. 3.
Figure 4B:
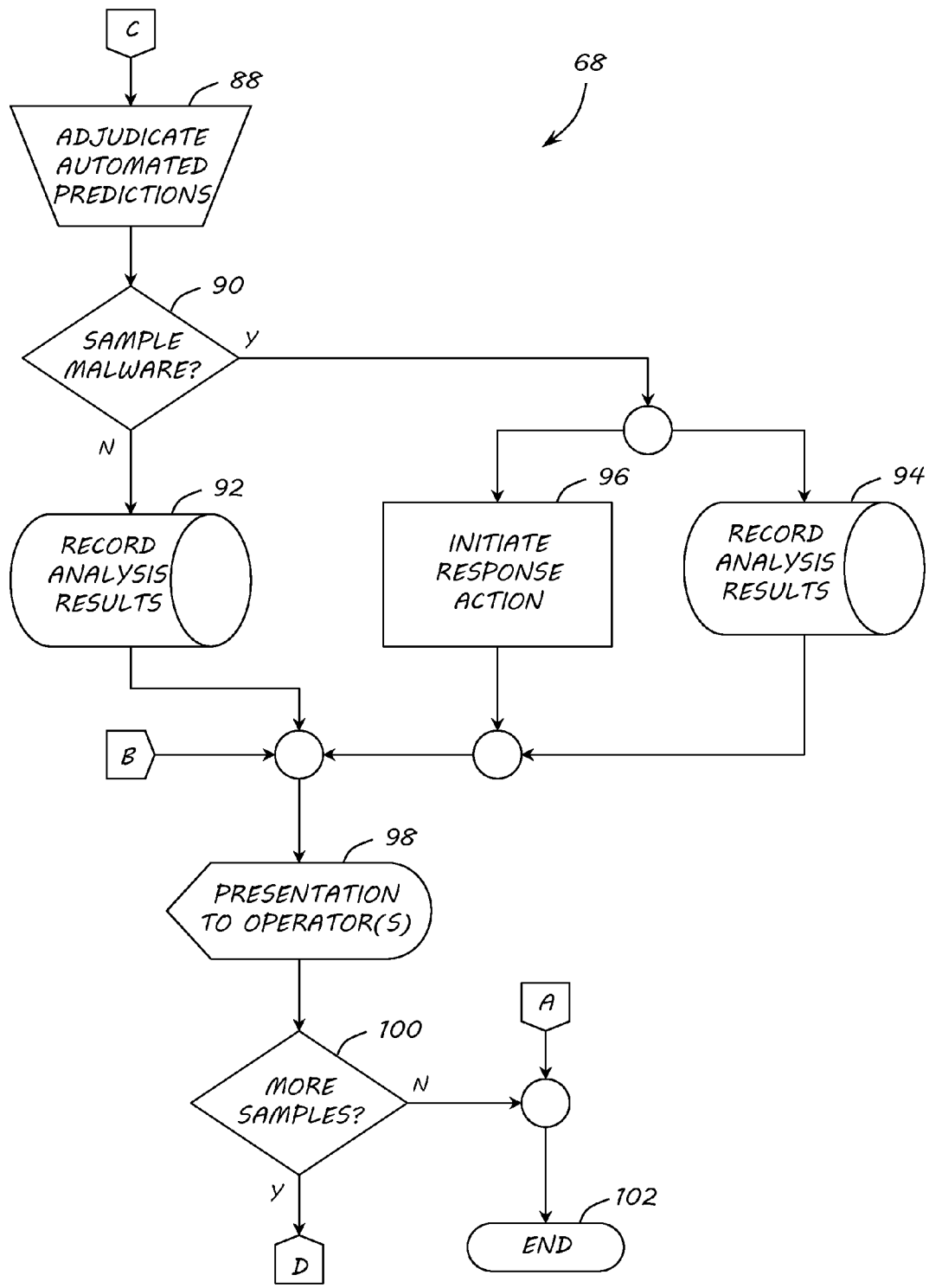

FIGS. 4A and 4B contain a flowchart 68 illustrating a specific embodiment implementing one possible process instantiation of this concept. The process begins at block 70. A new sample arrives at block 72 by user or automated submission to the embodiment of the invention. In block 74, a prediction is performed by static analysis methods, employing a suite of efficient methods (in terms of speed, which are generally static analysis methods, but other embodiment may employ other analysis methods) to generate an initial determination of whether or not the submitted sample is malware. For example, one of the static methods may include filtering out already observed samples by hash in some embodiments. If the sample is not malware ("No" branch of decision block 76) then record for reference, in block 78, the fact that the automated static analysis methods do not predict the sample to be malware along with any other pertinent information in a central file classification database, such as database 22. If the input queue contains more samples ("Yes" branch of decision block 80), then begin examining the next sample at block 72.

Some embodiments of this method may include pipelining static and dynamic analyses, as seen in the illustrated embodiment of FIGS. 4A and 4B. Since the most efficient methods determined that the file is malicious ("Yes" branch of decision block 76), attempt to obtain a second confirmation and additional information via dynamic analysis in block 82, though in other embodiments, other more time intensive methods may also be used. A second determination is made in block 84 to determine if the sample is potentially malicious based on less efficient source of indicators. If the determination is that the sample is not malicious ("No" branch of decision block 84), then record for reference in block 86 the fact that the automated static analysis methods predict the sample to be malware and automated dynamic analysis methods make a contradictory or inconclusive prediction of non-malware. These findings and any other pertinent information may again be recorded in a central file classification database.

If the sample is determined to be malicious ("Yes" branch of decision block 84), then conduct a human analysis of the predicted malware to adjudicate the automated system's prediction in block 88. A final determination is made in block 90 to determine if the sample is potentially malicious based on human analysis. If the sample is not malicious ("No" branch of decision block 90), then record for reference in block 92 the fact that both the automated static and dynamic analysis methods predict the sample to be malware, but the human malware analyst makes a contradictory or inconclusive prediction of non-malware. These findings and any other pertinent information may again be recorded in a central file classification database. This determination is not necessarily permanent as an organization may choose to periodically revisit the human decision, confirm the decision by another human analyst, or any other confirmatory action.

In some embodiments, the human operator(s) 48 can initiate appropriate response actions to recover from or mitigate the threat. As such, if the sample is determined to be malicious ("Yes" branch of decision block 90), then, in parallel, the fact that the automated static and dynamic analysis methods predict the sample to be malware and the human malware analyst confirms their predictions is recorded in block 94 and a response action is initiated in block 96. These findings and any other pertinent information may again be recorded in a central file classification database. Again, this determination may not necessarily be permanent as the organization can choose to periodically revisit the human decision, confirm the decision by another human analyst, or any other confirmatory action.

An organization's operators, or agents, typically have different responsibilities and information requirements based on their assigned roles. For example, low-level program instruction details are important to malware analysts, but not necessarily important to cyber defense operators or network administrators. As such, each type of operator requires a unique "view" of the information regarding the malware and its associated threat based on the perspective of their assigned roles. Furthermore, different individuals acting within the same role may have personal preferences for certain types of information as well and may require a customized "subview" of the information. Thus, the appropriate information is presented to an operator or operators in block 98. If the input queue contains more samples ("Yes" branch of decision block 100, then repeat the overall process for the next sample at block 72. Otherwise ("No" branch of decision block 100), the process ends at block 102.

As seen above in the overall system diagram in FIG. 3 and the illustrated embodiment in FIGS. 4A and 4B, the initial component uses static analysis indicators, which serves as a foundation for the overall architecture concept. In developmental tests, this component demonstrates effective malware sensitivity capabilities against both known and unknown malware sets. Its low false negative rate against known malware (<0.1%) is a strong indicator of its value as a pre-filter in the overall architecture based on its high sensitivity for malware detection. This initial component also exhibits a low false positive rate (<0.1%), which indicates a low tendency to inundate the next level of the analysis process with samples that are not malicious (i.e., wasted overhead). Overloading the malware analyst(s) has the negative effect of perceived diminished value by human operators, who quickly lose confidence in system predictions.

The low false positive and false negative rates make this initial component a near ideal first layer of this architectural process responsible for the lion's share of data reduction. If the faster analysis component(s) in the architecture (i.e., at the base of the pyramid in FIG. 2) do not adequately reduce the dataset of all potential software, such as a component with a high false positive rate, then the overall system functions inefficiently as the overwhelming number of samples are subject to the slower analysis methods. Also, if the faster component(s) in the architecture often misclassify malware as non-malware, attackers maintain their operational capabilities on the victim network.

This initial static analysis component demonstrates potential to perform the initial massive data reduction of the process not only for its low false negative and false positive rates, but also for its runtime performance. In development tests where it runs as a single thread of execution, embodiments of this component have been shown to scan over approximately 2,000 samples per second.

Figure 5:
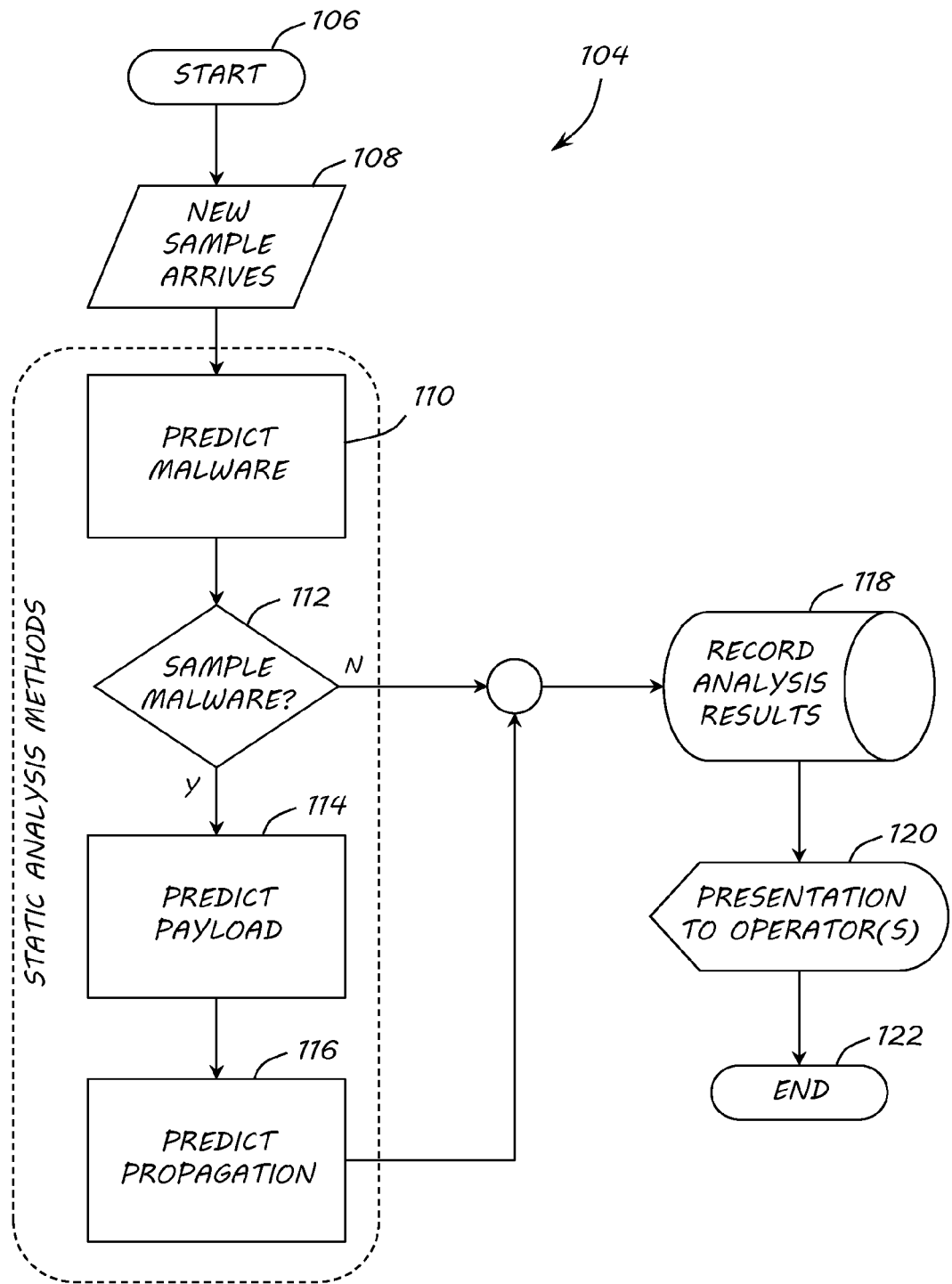
FIG. 5 is a flowchart depicting a static analysis component of the process in FIGS. 4A and 4B.

Flowchart 104 in FIG. 5, illustrates an exemplary embodiment of the static analysis component 32. A new sample arrives in block 108 by user or automated submission to the invention. A suite of most efficient methods (in terms of speed; generally static analysis methods, but not always) is employed in block 110 to generate an initial determination of whether or not the submitted sample is malware. Making the determination if the sample is potentially malicious based on static indicators is discussed in more detail below. If the system predicts that the sample is malicious ("Yes" branch of decision block 112), the sample's most likely payload is predicted in block 114. Then the sample's most likely propagation method is determined in block 116: Trojan, virus, or worm, among others. The resulting predictions of the static analysis method are recorded for reference in block 118 including other pertinent information (i.e., payload, propagation method, etc.) in a central file classification database. Results may then be presented in block 120 to each operator in an appropriate operator view as described earlier. The process completes at block 122.

Figure 6:
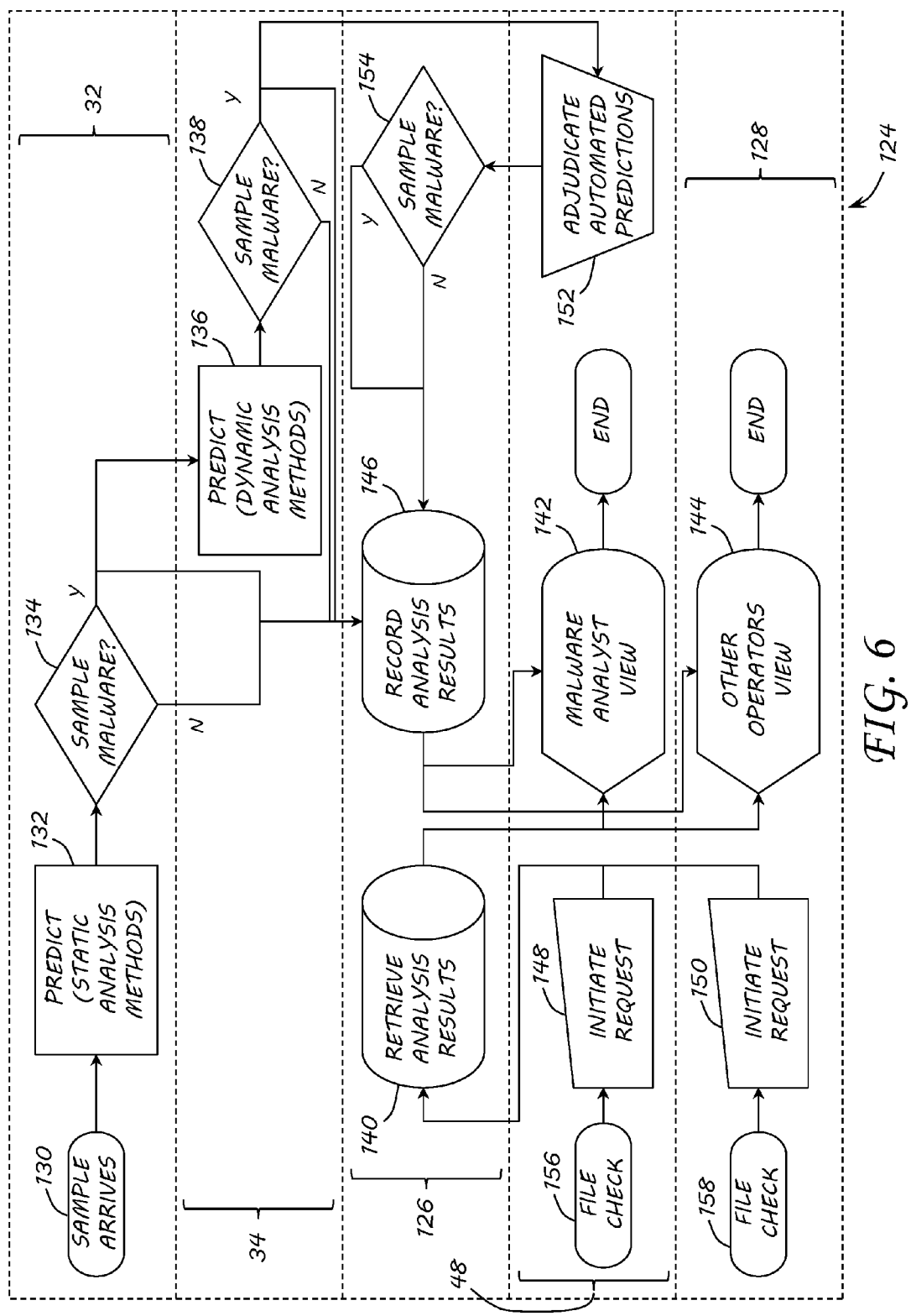
FIG. 6 is a flowchart depicting an alternate architectural process of the system process in FIG. 3.

In another exemplary embodiment, an architecture system flowchart 124 in FIG. 6 shows one possible implementation of the overall process from a resource/user perspective. This flowchart 124 includes functional bands for the static 32 and dynamic 34 analysis components, a central file-characterization database 126 for storing analysis results, a malware analyst 48 and a generic functional band for other operator roles 128.

This flowchart 124 portrays similar information as the flowchart 68 in FIGS. 4A and 4B, but with the additional context of resources and users. Other operator roles 128 may include, but are not limited to, chief information security officer, information assurance analysts, and security systems administrator.

Turning now to the flowchart 124, a new sample arrives in block 130 by user or automated submission to the embodiment of the invention. A suite of most efficient methods (in terms of speed; generally static analysis methods, but other methods may be used for other embodiments) is employed in block 132 to generate an initial determination of whether or not the submitted sample is malware. A determination is made in block 134 to determine if the sample is potentially malicious based on most efficient source of indicators.

Since the most efficient methods determined that the file is malicious ("Yes" branch of decision block 134), attempt to obtain a second confirmation and additional information via dynamic analysis in block 136, though other more time intensive methods may also be used in other embodiments. A second determination is made in block 138 to determine if the sample is potentially malicious based on less efficient source of indicators.

The results stored in the database are retrieved in block 140. Specific content retrieved depends on the operator view 142, 144. The various analysis results and any other pertinent information are recorded for future reference in a central file classification database in block 146.

An operator 48, 128 initiates a check in blocks 148 and 150 respectively in the file classification database for a specific file. The malware analyst may submit a request 148 for the analysis results of a specific file to the file classification database. The system presents the analysis results with a malware analyst "view" of the information regarding the file in block 142. The actual view may also be a user-specific "subview" of the information. Other operators may submit a request for the analysis results of a specific file to the file classification database in block 150. The system presents the analysis results with a role-specific "view" or a user-specific "subview" of the information in block 144.

If the sample above, from block 138, was determined to be malware ("Yes" branch of decision block 138), a human analysis of the predicted malware is conducted in block 152 to adjudicate the automated system's prediction. A final determination is made in block 154 to determine if the sample is potentially malicious based on human analysis. Alternatively, a malware analyst 48 or operator 128 may initiate a check in the file classification database for a specific file in blocks 156 and 158 respectively.

As can be seen from the overall system description and the illustrated embodiments above, a distinction between embodiments of the invention and other commercial and research products is its feature set. The embodiments are able to achieve high detection performance while restricting their features exclusively to high-level program structural anomalies and general structural data. Instead of following a mathematical model to determine features, the embodiments utilize features commonly used by analysts when examining samples to determine if they are indeed malicious.

The term "high-level" structural data refers to the basic structural format that an operating system loader may use when loading an executable program into memory before runtime and higher level information, such as common file attributes (e.g., name, path, file size, attributes, etc.). The sources for the structural anomalies come from a number of publications and as well as experience in working with program structure. Combining expert experience with program structural information capitalizes on analysts experience while allowing for identification of additional anomalous feature combinations.

As analysts examine samples, their previous experiences contribute to a prior knowledge of analysis technique effectiveness and past observations. Significant observations useful for confirming malice are anomalies primarily seen in malware. Routinely, analysts combine available anomaly information with structural information to either confirm their suspicion or look for additional anomalies. For instance, if the visible program disassembly is insufficiently small to provide any significant advertised function, the analyst may suspect that the program is packed. Many popular packers dedicate a program section for unpacking, but the section must allow reading and executing (as it will soon contain code). The section must also allow writing to unpack the obfuscated code before attempting to execute it. Analysts confirm these section permissions, or characteristics, by examining structural information for yet another anomaly.

Embodiments of the invention utilize over 100 static heuristic features based on structural anomalies and structural information itself. Many of the features in the embodiments are integral, unlike some contemporary approaches which use exclusively Boolean features. The embodiments also do not attempt to generate an instruction disassembly due to difficulties associated with validating its correctness. Nor do embodiments use instruction sequence signatures such as those used by commercial antivirus programs.

Structural anomalies are generally logical operations on program header information or file areas pointed to by header information. Classes of structural anomalies include: section names, section characteristics, entry point, imports, exports, and alignment, among others. Structure information, included to enable classifiers to identify additional anomalous combinations, may come directly from portable executable headers, such as an IMAGE_FILE_HEADER or an IMAGE_OPTIONAL_HEADER, for example. A description of some of the more popular anomaly features follows.

Non-Standard Section Names:

Some contemporary researchers identify the presence of a non-standard section name as anomalous. Microsoft Corporation defines several standard section names for portable executables and many compilers adopt this standard. This standardization has led to an overwhelming majority of non-malware containing only standard section names. According to current research, only about three percent of non-malware use unconventional section names, while about eighty percent of malware samples use non-standard names.

Non-Standard Section Characteristics:

Many contemporary researchers identify non-standard section characteristics as an anomaly. If a code section has read, execute and write characteristics instead of the normal read and execute characteristics, the code section immediately raises analysts' suspicions. Normally, a program uses sections with these permissions to unpack obfuscated code before attempting to execute it. This particular anomaly is common in malware, because packing is generally a common malware armoring technique.

Entry Points:

A program entry point that points to a section not marked as containing code is anomalous. A program whose entry point does not point to the code section (.text for default compiling) is another entry point anomaly. Packers commonly adjust the entry point to point to an additional code section to start the unpacking process.

Imports:

Inclusion of information regarding import libraries and functions is common among malware research. Common features include numbers of import libraries and functions. Executables with a low number of imported functions are suspicious, because programmers normally provide program utility by importing functions, such as I/O, encryption or complex math.

Exports:

Some contemporary researchers also identify dynamically-linked libraries that export no functions as anomalous. Since the purpose of a dynamically-linked library is to provide functionality to other programs via exported functions, the absence of exported functions is surely suspicious.

An impetus for embodiments of the invention concerns the strategic employment of malware by competitors to gain advantage clearly demonstrates motivation for such—albeit illegal—activities. If a major defense contractor builds a weapon system with specific capabilities, an intimate knowledge of those capabilities and engineering designs to achieve them may allow a competitor to build a superior system. The obtained information enables the competitor to use the victim company's intellectual property as a baseline for their system.

One theoretical hypothesis tested by embodiments of the invention is that static analysis techniques are inadequate to detect modern malware. Another hypothesis addressed by embodiments of the invention is the assumption that commercial antivirus systems alone are inadequate to defend against advanced, competitive threats. Occasionally, information assurance practitioners have advocated using multiple commercial antivirus products to address these same threats. Commercial antivirus products likely are inadequate for organization strategic defense, because of their availability to the attacker for testing against prior to conducting information operations.

The following discussion describes sources of samples for subsequent experiments and experimental designs and the measures of effectiveness used to test the above theories. The experimental designs focus on establishing an assessment between embodiments of the invention and known research, such as Kolter and Maloof (hereinafter KM) n-gram research. The measures of effectiveness chosen allow for full comparison to other work.

In reconstructing the KM experiment, their methodology is used to generate n-grams and employ their identified length of n=4 with a 1-byte sliding window. The KM experiment treats the presence of an indicated n-gram as a Boolean feature to its boosted decision tree classifier. Tests utilize only the 500 most relevant n-grams based on information gains as computed by the following formula:

$$IG(j) = \sum_{v_j \in \{0,1\}} \sum_{C \in C\{C_i\}} P(v_j, C_i) \log \frac{P(v_j, C_i)}{P(v_j)P(C_i)} \quad (1)$$

where $C_i$ is the ith class and $v_j$ indicates the presence or absence of the jth n-gram. The prior and conditional probabilities are self-explanatory. Details related to the KM experiment may be found in Kolter et al., "Learning to Detect Malicious Executables in the Wild," Proceedings of the 10th ACM SIGKDD International Conference on Knowledge Discovery and Data Mining, ACM, 2004, pp. 470-478.

The following experiments examine only 32-bit portable executable (PE) samples obtained from well known sources. All "clean" samples come from harvesting of clean installs of Microsoft Windows XP®, VISTA®, and WINDOWS 7®, while the malware samples come from an updated download of a dataset from VX Heavens Virus Collection. Specifically, the malware, or "dirty", samples are Trojans, worms, and viruses types as identified by the antivirus label assigned to them. Extractions of PEs from these sources yields 25,195 clean and 31,193 dirty samples for a total of 56,388 samples.

This experiment is a side-by-side comparison of leading static analysis malware detection techniques, specifically an embodiment of the invention and the previous KM n-gram research. For consistency with prior research, these tests both adopt a standard experimental design using stratified, ten-fold cross validation. Each disjoint fold contains roughly the same number of samples from malware and non-malware sets. During each run, a different fold functions as the test set while the remaining folds comprise the training set.

Each fold requires a determination of the top 500 n-grams specific to that fold's training set for the KM technique. Classifiers train on only the samples from a fold's training set and test results come from application of the trained classifier to the fold's test set. The embodiment of the invention and the KM retest use identical folds.

Using the described KM parameters for generating n-grams yields a mean of 2,103,005,388 unique n-grams across training sets. Given that n=4, this results in a 49% saturation of the possible 4-gram space. KM observe a saturation rate of only 6% in their large dataset in their original experiment.

Determining the set of n-grams using the KM method requires extensive "computational overhead". The datasets become too large to store in memory and as a result, calculations must resort to heavy disk-utilization with deliberate runtime performance optimization. The number of expected unique n-grams is a critical implementation factor, as it is key in determining how best to partition the n-gram data space.

In this experiment, the KM n-gram generation technique generates a mean of 2,103,005,388 unique n-grams across training sets. This results in a larger saturation level of $2,103,005,388/2^{32}=49\%$ compared to the saturation level of 6% from the KM research. While this saturation level causes complications for determining the top n-grams to select, it does not impede the KM model classification performance, because the saturation of the n-gram space does not affect final model decisions which occur in the leaves of decision trees. Theoretically, the KM model uses 500 Boolean features which yields $2^{500}=3.27\times10^{150}$ potential leaf combinations given the decision tree classifier.

Figure 7:
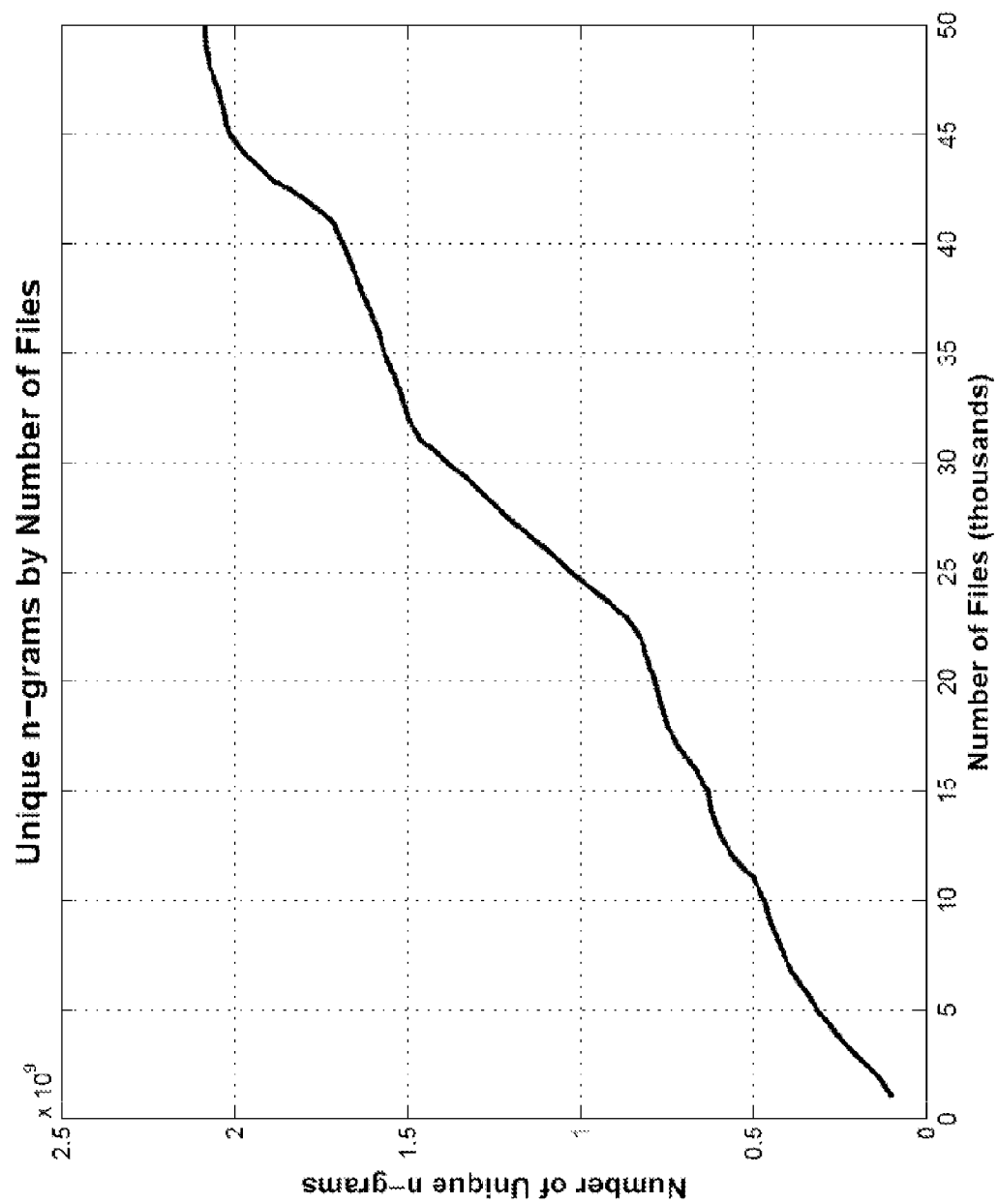
FIG. 7 is a graph of a number of unique n-grams by number of files.

FIG. 7 is a plot showing the number of unique n-grams growing as the number of files parsed increases. Unfortunately, the two have a clearly linear relationship for the range tested with a strong Pearson's correlation of 0.9950. The larger sample sizes also force calculations to predominantly disk-based solutions.

Figures 8, 9:
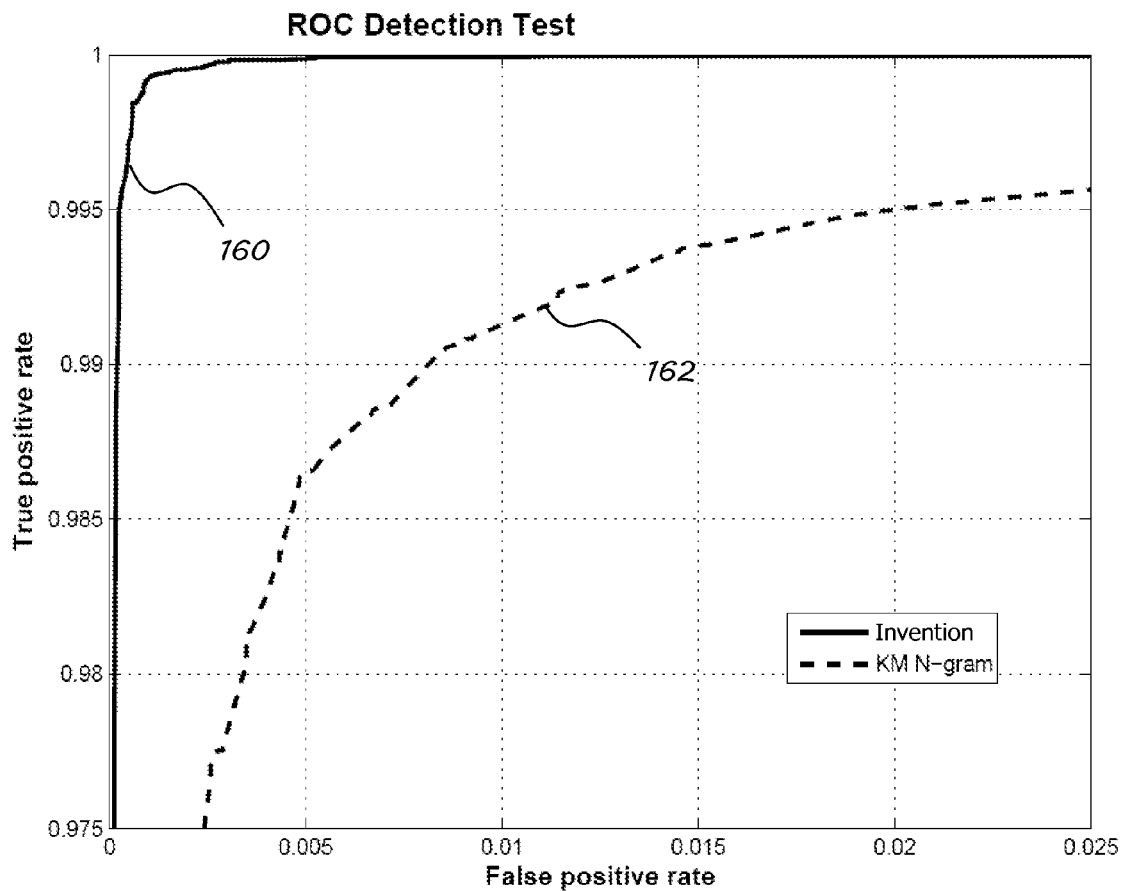
FIG. 8 is a table containing the top seven n-grams across all folds in the test data.
FIG. 9 is a graph of the receiver operating characteristic (ROC) curves for an embodiment of the invention and an n-gram retest following the Kolter and Maloof methodology.

The KM method selects a total of only 505 unique n-grams to use as features across all ten folds making fold selections quite consistent. The table in FIG. 8 shows the top seven n-grams for all folds. The primary difference of the remaining n-grams across folds is their order.

One observation about this partial listing is that the selected n-grams appear to focus on capturing specific byte sequences peculiar to each class. For instance, the first n-gram 0x00560001 is a 1-byte shift from the second n-gram chosen 0x56000100. This pattern propagates through the selections with potentially longer byte sequences daisy-chained together. A second observation is the prevalence of zero bytes (0x00) throughout the selections. Nearly 44% of all selected n-gram bytes are zero bytes. Closer examination of the zero bytes reveals a potential pattern of UNICODE character representations, zero bytes followed by non-zero bytes. This pattern is visible in 79% of all n-grams selected. KM has noted the difficulty in validating why n-grams work for classifying PEs. As an example, they found a mysterious n-gram (0x0000000A) in their studies, which they cannot attribute as being code, data, or structure. This specific n-gram 0x0000000A is found in a comparable percentage of samples in the expanded malware set from VX Heavens as KM cite, but the same n-gram also appears in 83% of the non-malware set and the information gain feature selection algorithm never ranks it in the top 500 for any folds.

Embodiments of the invention avoid some of the validation problem by using only contextually important information as features. Using common anomalies and irrefutable structural information that analysts routinely use in making their assessments provides strong validation of the embodiments' results. As a result, an analyst can confirm its decisions based on meaningful observations.

The resulting classifiers from the original KM research are ensembles of small trees, averaging 90 nodes. In the KM retest, the tree sizes are much larger averaging 2,824 nodes per tree. Given the 49% saturation of the 4-gram space and the much larger sampling in the retest, the trees likely had to grow substantially to minimize impurity at the leaf nodes.

An embodiment of the invention averages 354 nodes per tree in these tests. The simpler tree representations of the embodiment are likely due to the expressive power of the augmenting the Boolean features with interval features. The trees in the KM retest have inefficient representations as all features are Boolean, which forces trees to grow significantly larger to accommodate the increased saturation of the n-gram space.

The graph in FIG. 9 shows a magnification of the ROC curves for both the embodiment of the invention 160 and the KM n-gram retest 162. While both methods demonstrate excellent results, the embodiment of the invention achieves a more ideal ROC curve as it tracks closer to the left and top sides, resulting in a mean AUC of 0.999914 for the embodiment compared to 0.999173 for the KM retest. Furthermore, the embodiment of the invention fails to exhibits a lower true positive rate (TPR) or a higher false positive rate (FPR) than the KM retest for any given threshold values tested for the ROC plot. While the resulting AUC performance difference is statistically significant, it is not necessarily practically significant as both methods are close to ideal.

The tables in FIGS. 10 and 11 are the resulting AUC and accuracy confidence intervals for the embodiment of the invention, the KM retest, and past research. The AUC results for the KM retest are a statistically significant 0.34% improvement from their original research. This observation is quite interesting considering the increased saturation of the possible n-gram space for this larger test, but the classifier adequately compensates by extending the length of branches to utilize more of the available combination space.

Although the confidence intervals for the embodiment of the invention and the KM retest are close, the embodiment demonstrates superior results that are statistically significant to both the KM original and the retest. This consistency may indicate a higher saliency value of structural and anomaly data for detecting malware than n-grams, which are typically used for text classification. However, both results strongly suggest that static heuristic methods remain viable for malware detection.

For compatible comparison with other research, the table in FIG. 11 includes the apparent accuracy statistics. The embodiment's accuracy is significantly better than those for the KM retest as the confidence intervals do not overlap. While the embodiment's accuracy is consistent with its AUC results, the KM retest reveals an unexplainably lower accuracy than one may anticipate. Analysis of the additional metric now leads to practically significant results as the accuracy results of the KM retest are nearly a full percentage point below the results of the embodiment of the invention. The accuracy advantage of the embodiment is an aggregate indicator of a significant impact on its operational utility. Discussion of this impact requires computation of FPR and FNR (addressed later).

The best finding from the work by Schultz et al. in "Data Mining Methods for Detection of New Malicious Executables," IEEE Symposium on Security and Privacy, IEEE, 2001, pp. 38-49, the strings classifier, has a much lower mean accuracy, and they do not include any confidence interval to describe variability in their published research. The simplicity of defeating a classifier based solely on strings was a key factor in the decision to not repeat their experiment or a similar variant.

Additionally, Schultz's best structure/anomaly result has a mean accuracy of 0.8936, which is substantially lower than the embodiment of the invention. This discrepancy is most likely attributed to the small sample sizes used in Schultz's work. Schultz et al. state in their published research that they had a limited subset of 244 PEs (206 benign and 38 malicious).

The table in FIG. 12 shows the mean confusion matrix elements across the ten folds for the experiment. In the table, TP, FP, TN and FN stand for the standard true and false positives and negatives. The embodiment of the invention averages only 5 total misclassifications, while the KM retest has 57.

The confusion matrix data provides the values to determine the FPR and false negative rate (FNR) as shown in the table in FIG. 13. Again, Schultz et al. do not report confidence interval data, but their reported FPR and FNR appear quite different than both the embodiment of the invention and the KM retest results. Once again, the embodiment's results for both FPR and FNR are significantly superior to those of the KM retest. Furthermore, the embodiment's FPR and FNR is lower than the 1% and 15-20% respectively from the work of Tesauro et al., "Neural Networks for Computer Virus Recognition," IEEE Expert 11 (4) (1996) 5-6, while the embodiment of the invention additionally detects forms of malware other than boot sector viruses.

Finally, these FPR and FNR results illuminate a significant operational utility advantage of invention's methodology versus KM's. Operationally, the FPR directly relates to additional analyst workload, which is a form of resource waste as the additional samples are all non-malicious. The FNR also has operational implications, because it describes the method's inability to detect malicious samples. While neither a high FPR or a high FNR is desirable, arguably the FPR is more significant, because it has such cascading effects given the normal distortion of sampling from the non-malware and malware classes.

For example, a typical clean installation of an operating system and office productivity software normally yields approximately 10,000 unique PEs, and this number will continually increase during system deployment. An advanced competitor may only require 1 or 2 malware artifacts to conduct effective offensive information operations. Given this estimate of a best case scenario, a 0.1% FPR yields 10 additional non-malware samples for an analyst to examine in addition to any malware samples detected. If the FPR rate is higher, the factor for resource waste increases linearly. This example also illustrates the value of a low FNR, because a method with a high FNR may miss the small number of malware artifacts present on a system.

A second validation was performed with unique source of data and comparing an embodiment of the invention, the KM retest, and three major commercial antivirus products. Using publicly unknown malware samples in this validation test clearly demonstrates the extensibility of malware detection methodologies to a realistic, operational environment to detect currently unknown threats. The experimental design focuses on establishing an assessment between the embodiment of the invention and the KM n-gram research as well as testing both of these research methods against commercial antivirus products.

The data source for this test is a set of 278 malware samples discovered by multiple anonymous organizations. Local organizational policies generally restrict distribution of any discovered samples—even to antivirus vendors for signature development. These organizations believe these samples are custom malware employed by aggressive competitors giving this particular sample set high strategic value. The only samples used in this particular test are malware samples.

This specific test compares the performance results of the invention, the KM retest, and three major commercial antivirus vendor products on the unknown malware samples. The only metric recorded for this test is TPR, because of the lack of any negative class samples and the limited thresholding capabilities of the commercial antivirus products tested. In this case, the dataset is strictly a test set split into appropriate folds. No classifier training uses extracted features from any of the unknown malware set samples.

For the embodiment of the invention and the KM retest, this test uses the highest accuracy (already trained) classifiers from the previous test results. Due to the smaller test sampling, pilot studies showed relatively large confidence intervals when conducting only the 10-fold cross validation runs as in the previous tests. Accordingly, this test replicates the 10-fold cross validation runs 10 times using unique validation sets for each replication. Otherwise, this test uses the same methodology as the previously described tests.

The commercial antivirus products use default installation settings and have current updated signatures at the time of this experiment. Product scan results against the entire unknown malware set yield product-specific sets of all signature and heuristic hits. The intersection between the sample sets associated with each fold and these sets indicates the number of correct detections, while the difference is the number of false negatives. Otherwise, antivirus product test metrics and confidence interval computations are identical to the embodiment of the invention and the KM retest.

The table in FIG. 14 shows the performance results against the unknown malware samples. Both the embodiment and KM retest results resemble their previous test performance, but exhibit performance drops of 1.4% and 4.5% respectively. The disparity in performance between these two techniques increases against the unknown malware set and the differences are statistically significant. None of the commercial antivirus products exceed 50% TPR on the unknown malware set, a clear indication of the need for detection tools similar to embodiments of the invention.

Given the antivirus product detection information, further description of the unknown malware dataset is possible. For instance, the union of all antivirus detections accounts for 60% of the 278 samples, which validates the findings from the organizations who discovered them, but this observation has another implication. An occasional proposition in information assurance circles is the suggested employment of multiple antivirus products. Considering that a combination of three commercial antivirus products yields only a 60% detection rate on these samples, implies that the return on investment, especially for large volume enterprise license purchases, is limited.

Combining generic detection methods, such as embodiments of the invention, with commercial antivirus products may simplify discovery of advanced, competitive threats. For instance, antivirus products detect high rates of common malware, but their performance drops dramatically against unknown malware. However, the difference between sets of detections from a commercial product and a generic detection method should contain primarily advanced threat samples.

Pattern recognition techniques can play a substantial role in malware detection especially in cyber situational awareness and mission assurance. In exceedingly complex networks, simplifying assessment of operational readiness is a significant improvement and leads to better risk management. The invention's high confidence detection rate coupled with its low FPR enable an aggressive defense against adversary intrusion. Furthermore, its low FNR implies that the invention does not often mistake malware for benign software, which is also highly encouraging.

The invention's performance results are convincing evidence that static heuristic methods are still operationally viable for malware detection, even without detailed instruction disassembly information. The invention also demonstrates a significant advancement over previously published static heuristic methods, even on research using similar features. Not only does the invention have the highest accuracy and AUC, but also the lowest FPR and FNR. Furthermore, the invention achieves superior results while using only contextually important observations as features.

The test results of unknown malware samples with the embodiment of the invention, the KM retest, and commercial antivirus products demonstrate the invention's suitability for detection of unknown malware in an operational environment. This set of unknown malware is a significant sampling of advanced, competitive threat tools. While the embodiment of the invention detects nearly 99% of the unknown samples, the commercial antivirus products combine to detect only 60%.

Accurate detection of malware with a low FPR provides maximum efficiency for prioritizing malware analysis operations, specifically prioritization for more resource intensive dynamic analysis methods and human analysts. A combinatorial approach can significantly augment the effectiveness of either method alone, because the hybrid solution can more thoroughly assess likely targets first.

The high accuracy in generic malware detection provides a significant fine granularity capability advancement for cyber situational awareness within complete local organization control. Given the true positive rates of the embodiment of the invention versus current commercial antivirus products, a static heuristic malware detection method is a potentially "game changing" technology that can shift the cyber battlefield in overwhelming favor of the defenders. It also provides critical information to enable organizational leadership to consider available response options and future defense investments.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of recognizing malware in a computing environment having at least one computer, the method comprising:
   receiving a sample;
   automatically making an initial determination by the at least one computer if the sample is malware using static analysis methods, wherein the static analysis methods include:
   determining if the sample is malware;
   in response to determining the sample is malware, predicting a payload of the sample and predicting a propagation method of the malware; and
   recording analysis results, including payload and propagation, in a central classification database;
   in response to the static analysis methods determining the sample is malware, using dynamic analysis methods by the at least one computer to automatically make a subsequent determination if the sample is malware;
   in response to the dynamic analysis methods determining the sample is malware, presenting the sample to a malware analyst to adjudicate the initial and subsequent determinations of the static and dynamic analyses; and
   in response to the adjudication determining the sample is malware, initiating a response action to recover from or mitigate a threat of the sample.

2. The method of claim 1, further comprising:
   recording automatic determination of static analysis methods in a central classification database.

3. The method of claim 1, further comprising:
   recording automatic determination of dynamic analysis methods in a central classification database.

4. The method of claim 1, further comprising:
   recording adjudication of malware analyst in a central classification database.

5. The method of claim 1, wherein the sample is a portable executable file.

6. The method of claim 1, wherein the propagation method is selected from a group consisting of Trojan, virus, worm, and combinations thereof.

7. The method of claim 1, wherein the determination comprises:
   identifying high-level program structural anomalies,
   wherein the structural anomalies include logical operations on program header information or file areas pointed to by header information.

8. The method of claim 7, wherein classes of structural anomalies are selected from a group consisting of: section names, section characteristics, entry point, imports, exports, alignment, and combinations thereof.

9. The method of claim 1, wherein an operator initiates a check in a file classification database for a specific file by providing the file as the sample.

10. The method of claim 9, wherein the operator is a malware analyst.

11. An apparatus comprising:
    a memory;
    a processor; and
    a program code resident in the memory and configured to be executed by the processor for recognizing malware, the program code further configured to receive a sample, automatically make an initial determination if the sample is malware using static analysis methods, wherein the static analysis methods include determining if the sample is malware, in response to determining the sample is malware, predicting a payload of the sample and predicting a propagation method of the malware, and recording analysis results, including payload and propagation, in a central classification database, the program code further configured to, in response to the static analysis methods determining the sample is malware, use dynamic analysis methods to automatically make a subsequent determination if the sample is malware, in response to the dynamic analysis methods determining the sample is malware, present the sample to a malware analyst to adjudicate the initial and subsequent determinations of the static and dynamic analyses, and receive a response action to recover from or mitigate a threat of the sample if the adjudication determines the sample is malware.

12. The apparatus of claim 11, wherein the program code is further configured to:

record automatic determination of static analysis methods in a central classification database.

13. The apparatus of claim 11, wherein the program code is further configured to:

record automatic determination of dynamic analysis methods in a central classification database.

14. The apparatus of claim 11, wherein the program code is further configured to:

record adjudication of malware analyst in a central classification database.

15. The apparatus of claim 11, wherein the propagation method is selected from a group consisting of Trojan, virus, worm, and combinations thereof.

16. The apparatus of claim 11, wherein the program code is configured to determine if the sample is malware by:

identifying high-level program structural anomalies, wherein the structural anomalies include logical operations on program header information or file areas pointed to by header information.

17. The apparatus of claim 16, wherein classes of structural anomalies are selected from a group consisting of: section names, section characteristics, entry point, imports, exports, alignment, and combinations thereof.

18. A program product comprising:

a non-transitory computer recordable type medium; and a program code configured to recognize malware, the program code resident on the computer recordable type medium and further configured, when executed on a hardware implemented processor, to receive a sample, automatically make an initial determination if the sample is malware using static analysis methods, wherein the static analysis methods include determining if the sample is malware, in response to determining the sample is malware, predicting a payload of the sample and predicting a propagation method of the malware, and recording analysis results, including payload and propagation, in a central classification database, the program code further configured to, in response to the static analysis methods determining the sample is malware, use dynamic analysis methods to automatically make a subsequent determination if the sample is malware, in response to the dynamic analysis methods determining the sample is malware, present the sample to a malware analyst to adjudicate the initial and subsequent determinations of the static and dynamic analyses, and receive a response action to recover from or mitigate a threat of the sample if the adjudication determines the sample is malware.

\* \* \* \* \*